United States Patent
Tengner

(10) Patent No.: US 10,840,731 B2
(45) Date of Patent: Nov. 17, 2020

(54) HIGH POWER FLASH BATTERY SYSTEM AND METHOD THEREOF

(71) Applicant: ABB Power Grids Switzerland AG, Baden (CH)

(72) Inventor: Tomas Tengner, Baerums Verk (NO)

(73) Assignee: ABB Power Grids Switzerland AG, Baden (CH)

( * ) Notice: Subject to any disclaimer, the term of this patent is extended or adjusted under 35 U.S.C. 154(b) by 0 days.

(21) Appl. No.: 16/469,017

(22) PCT Filed: Dec. 20, 2016

(86) PCT No.: PCT/EP2016/081937
§ 371 (c)(1),
(2) Date: Jun. 12, 2019

(87) PCT Pub. No.: WO2018/113924
PCT Pub. Date: Jun. 28, 2018

(65) Prior Publication Data
US 2019/0386494 A1    Dec. 19, 2019

(51) Int. Cl.
*H02J 7/34* (2006.01)
*B60L 53/10* (2019.01)
(Continued)

(52) U.S. Cl.
CPC .............. *H02J 7/342* (2020.01); *B60L 53/11* (2019.02); *B60L 53/14* (2019.02); *H02J 7/007* (2013.01);
(Continued)

(58) Field of Classification Search
CPC ...... H02J 7/022; H02J 7/045; H02M 3/33592; Y02B 40/90
See application file for complete search history.

(56) References Cited

U.S. PATENT DOCUMENTS

| 2007/0252557 A1 | 11/2007 | Nollet |
| 2010/0164446 A1* | 7/2010 | Matsuo ................. H02M 3/156 323/282 |

(Continued)

FOREIGN PATENT DOCUMENTS

| CN | 104518518 A | 4/2015 |
| DE | 10 2014 213 161 A1 | 1/2016 |

(Continued)

OTHER PUBLICATIONS

Christen et al., "Highly Efficient and Compact DC-DC Converter for Ultra-Fast Charging of Electric Vehicles", 15th International Power Electronics and Motion Control Conference, EPE-PEMC 2012 ECCE Europe, Novi Sad, Serbia, 2012, pp. LS5d.3-1-LS5d. 3-8.

(Continued)

*Primary Examiner* — Richard Isla
*Assistant Examiner* — Johali A Torres Ruiz
(74) *Attorney, Agent, or Firm* — Slater Matsil, LLP

(57) ABSTRACT

A high power flash battery system includes a wayside flash battery and a half-bridge cell. The half-bridge cell has a voltage polarity opposite to that of the wayside flash battery. The half-bridge cell is configured to be in a voltage compensation mode when the system is unloaded, and to be switched to a bypass mode when a voltage drop occurs due to the system being loaded. A high power charging station, an onboard battery operated device, as well as a method for flash charging are also presented.

17 Claims, 4 Drawing Sheets

(51) Int. Cl.
  *B60L 53/14*  (2019.01)
  *H02J 7/00*   (2006.01)
  *B60L 53/30*  (2019.01)

(52) U.S. Cl.
  CPC .......... *H02J 7/0013* (2013.01); *H02J 7/345* (2013.01); *B60L 53/32* (2019.02)

(56) References Cited

U.S. PATENT DOCUMENTS

| | | | |
|---|---|---|---|
| 2012/0133203 A1* | 5/2012 | Lienkamp | B60L 7/14 307/9.1 |
| 2016/0020628 A1 | 1/2016 | Guo et al. | |
| 2017/0057363 A1* | 3/2017 | Huh | B60L 50/50 |
| 2017/0163052 A1 | 6/2017 | Butzmann | |

FOREIGN PATENT DOCUMENTS

| | | |
|---|---|---|
| EP | 1 850 446 A1 | 10/2007 |
| WO | WO 2011/139675 A1 | 11/2011 |
| WO | WO 2013/170899 A1 | 11/2013 |
| WO | WO 2016/065059 A1 | 4/2016 |

OTHER PUBLICATIONS

International Search Report, issued in PCT/EP2016/081937, dated Jul. 26, 2017.
Written Opinion of the International Searching Authority; issued in PCT/EP2016/081937, dated Jul. 26, 2017.

\* cited by examiner

HIGH POWER FLASH BATTERY SYSTEM AND METHOD THEREOF

TECHNICAL FIELD

The invention relates to a high power flash battery system, a high power charging station, an onboard battery operated device, and a method thereof.

BACKGROUND

Flash charging for electrical busses uses charging stations to quickly charge batteries onboard the busses during short stops.

At regular bus stops, an onboard bus battery is flash charged with 600 kW during 15-20 seconds via a rooftop robotic contact. To avoid expensive grid connections at the flash charging stations, a wayside storage battery is installed in the flash charging station. A DC-DC boost converter is controlling the power flow from the wayside flash battery to the onboard bus battery.

WO 2013/170899 discloses a battery energy storage arranged to be connected to a capacitor link, which is connected in parallel to a power converter.

SUMMARY

An object of the present invention is how to enable reduced size of the wayside flash batteries, without compromising their ability to deliver sufficient energy and power during a flash charge event.

According to a first aspect, there is presented a high power flash battery system. The system comprises a wayside flash battery and a half-bridge cell. The half-bridge cell has a voltage polarity opposite to that of the wayside flash battery, wherein the half-bridge cell is configured to be in a voltage compensation mode when the system is unloaded, and to be switched to a bypass mode when a voltage drop occurs due to the system being loaded.

With the presented system, a load can still be charged by a high power wayside flash battery, wherein the wayside flash battery can be made much smaller with the use of the half-bridge cell than without the use of the half-bridge cell.

The half-bridge cell may comprise two switches configured to work in complementary mode to provide the voltage compensation mode and the bypass mode, respectively.

The half-bridge cell may comprise a capacitor, a supercapacitor, or an electrochemical battery, connected in series between the wayside flash battery through a first switch and a load. The load may be a DC-DC converter, e.g. of buck, boost, or buck/boost type. The load may alternatively be a DC-AC converter of any type or any other type of electric load. The half-bridge cell may comprise a low power discharge circuit configured to prevent capacitor voltage drift during repeated operation.

According to a second aspect, there is presented a high power, charging station. The high power, charging station comprises a wayside flash battery and a half-bridge cell connected in series with the wayside flash battery, and which half-bridge cell has a voltage polarity opposite to that of the wayside flash battery, wherein the half-bridge cell is configured to be in a voltage decrease mode when the station is unloaded, and to be switched to a bypass mode when a voltage drop occurs due to the system being loaded.

According to a third aspect, there is presented an onboard battery operated device. The device comprises a battery and a half-bridge cell connected in series with the battery, and which half-bridge cell has a voltage polarity equal to that of the battery, wherein the half-bridge cell is configured to be in a voltage increase mode when the device is not charged, and to be switched to a bypass mode when a voltage drop occurs due to the device being charged.

According to a fourth aspect, there is presented a method for flash charging of an onboard battery from a high power, wayside flash battery. The method comprises initiate charging of the onboard battery through a half-bridge cell, which half-bridge cell has a voltage polarity opposite to that of the high power wayside flash battery, and continue charging of the onboard battery with the half-bridge cell bypassed.

The half-bridge cell may be bypassed when a voltage drop occurs after the initial charging.

The method may comprise stop charging of the onboard battery when a charging voltage of the high power, wayside flash battery drops below a minimum voltage of DC-DC converter connected between the half-bridge cell and the onboard battery.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The present invention may e.g. be implanted in an electric city bus equipped with a fairly small on-board battery to enable a more useful load, i.e. passengers.

Due to very high power and tight limitations on battery voltage range, a flash station battery systems have to be significantly over-dimensioned to get a low enough DC impedance (to reduce voltage drop during a typical 20 s flash charging event). This is undesirable because it increase footprint and add significant cost to the flash battery system. With the presented invention, the flash battery system size can be reduced with up to 60%.

An advantage of the present invention is increased design flexibility in this type of high power, battery system with impedance constrained applications. A flash station application is provided as an example, but the present invention can be applied in many other applications with high power and tight requirements on voltage and current such as flash-charged shuttle ferries, particle accelerators, and high-power lasers.

Figure 1:
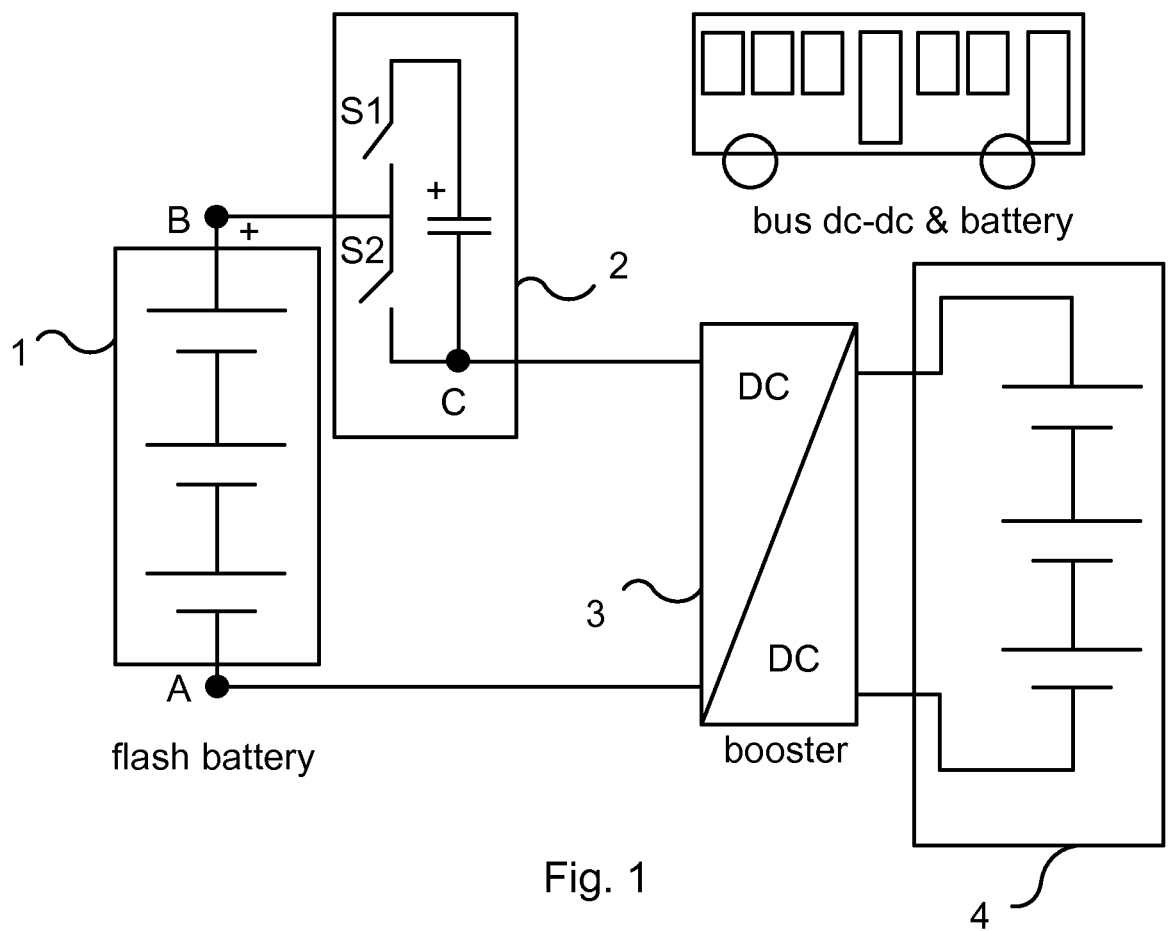
FIG. 1 is a schematic diagram illustrating an embodiment of a flash battery system and a load, in this case a DC-DC converter charging a flash-charged bus battery.

In FIG. 1 a half-bridge cell 2 is shown connected in series with a wayside flash battery 1. The voltage polarity of the half-bridge cell is opposite to that of the wayside flash battery. Switches S1 and S2 are configured to be switched in complementary mode. If S1 is in blocking mode and S2 is in conducting mode, the voltage exposed to a DC-DC converter 3 will be $V_{batt}$, i.e. a bypass mode. However, if S1 is conducting while S2 is blocking, the DC-DC converter will see the voltage $V_{batt} - V_{half\_bridge}$, i.e. a voltage compensation mode. The latter configuration will be used during no-load conditions, i.e. with the wayside battery (i) corresponding to open circuit voltage (OCV) $V_{batt,OCV}$. This allows the battery system's no-load voltage to be $V_{batt,max} + V_{half\_bridge} = V_{max,dcdc}$. At the moment a discharge load current is applied, an instantaneous voltage drop corresponding to $I_{batt} * R_{batt,series}$ will appear over the wayside battery (1), hence the battery voltage drops to $V_{OCV} - I_{batt} * R_{batt,series}$. As soon as this voltage drop has appeared, the S1 and S2 states are configured to be toggled such that the $V_{half\_bridge}$ is bypassed. By this, the battery charging system can be dimensioned for a battery voltage that is $V_{half\_bridge}$ higher than $V_{max,dcdc}$, and hence allow a much larger proportional voltage drop over the wayside flash battery 1 until it hits the minimum voltage of the DC-DC converter ($V_{min,dcdc}$). In the example below, it will be shown that this will allow reduction of the size of the battery system significantly. The DC-DC converter requires a certain voltage margin (minimum boost ratio) between the wayside battery 1 and the onboard battery 4. A voltage less than the margin will not guarantee a stable operation of the DC-DC converter.

The switches S1 and S2 are controlled in a complementary mode, such that one is always conducting. The control of these switches can be done locally, i.e. based on current and voltage sensor values and a dedicated analogue circuit a digital logic circuit, a programmable device or a combination thereof. The control of S1 and S2 can also be managed either by added functionality of a Battery Management System (BMS) or by a controller that controls the load (e.g. the DC-DC converter).

FIG. 1 illustrates a schematic drawing of a flash charging system according to an embodiment, with the half-bridge cell, or Battery Voltage Drop Compensator. The voltage rating of the half-bridge cell may be small compared to the system voltage. Moreover a capacitor of the half-bridge cell will only need to carry current during a very short transition period between no-load and load scenarios, measured in the milliseconds range. Hence the capacitance can be kept reasonably small. A low power discharge circuit, e.g. a Schottky diode and a resistor, may be added parallel to the capacitor to prevent the capacitor voltage to drift away during repeated operation. Another example of a low power discharge circuit is an active transistor controlled discharge circuit.

Figure 2:
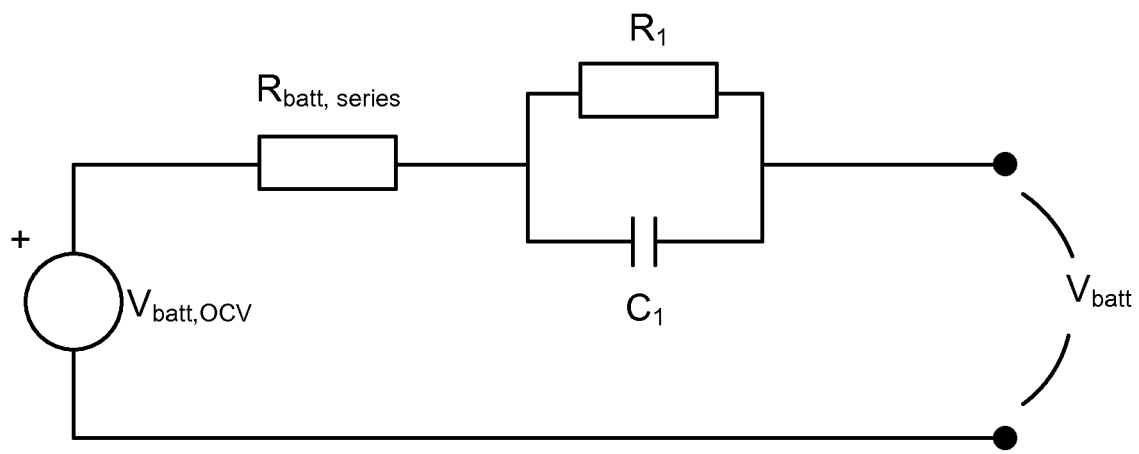
FIG. 2 is a schematic diagram illustrating an electric equivalent circuit of the flash battery system shown in FIG. 1.

FIG. 2 shows a typical electric equivalent circuit of the battery system illustrated in FIG. 1. The equivalent circuit comprise the wayside flash battery's open circuit voltage $V_{batt,OCV}$, which is dependent on a current state-of-charge of the battery 4. The equivalent circuit also models series resistance $R_{batt,series}$ that include resistance in the battery cells, bus bars, cables, switchgear, etc of the battery operated device. An $R_1$ and $C_1$ circuit models time and current dependent behaviour of the battery cells that origin from polarization effects in the battery cells.

Figure 3:
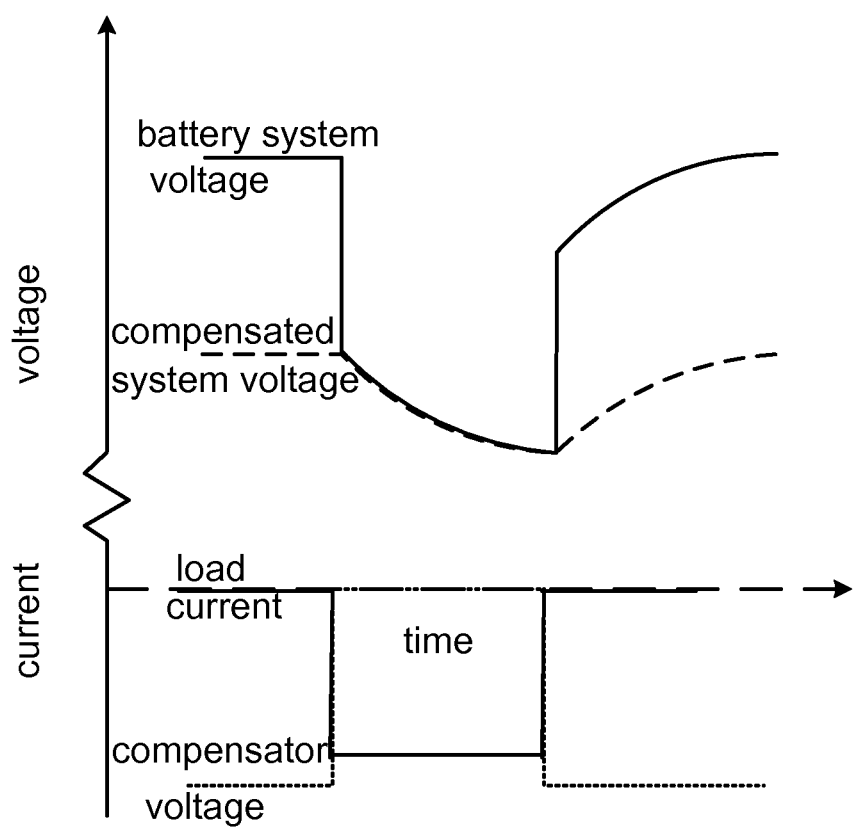
FIG. 3 is a schematic diagram illustrating voltage responses of a battery system with and without a battery half-bridge cell according to the present invention.

FIG. 3 shows a typical voltage response for a battery system voltage, when a constant discharge current pulse (load current) is applied. The instantaneous voltage drop comes from $I_{batt} * R_{batt,series}$, while the gradually dropping voltage comes from the polarization effect. The compensator voltage of the half-bridge cell is shown in short dash and the compensated total system voltage is shown in long dash.

The switches S1 and S2 of the half-bridge cell must be able to carry a full load current (1200 A in an example below), however they will be switched only once in the beginning of the flash pulse and hence switching losses will not be present. Moreover, the switch S1 will only see the full load current during maximum a few milliseconds, which eases up the requirements thereof further. Finally the voltage rating of the switching devices S1 and S2 can be a fraction of the battery system voltage, which further limits the cost and the conduction losses of the half-bridge cell.

Figure 5:
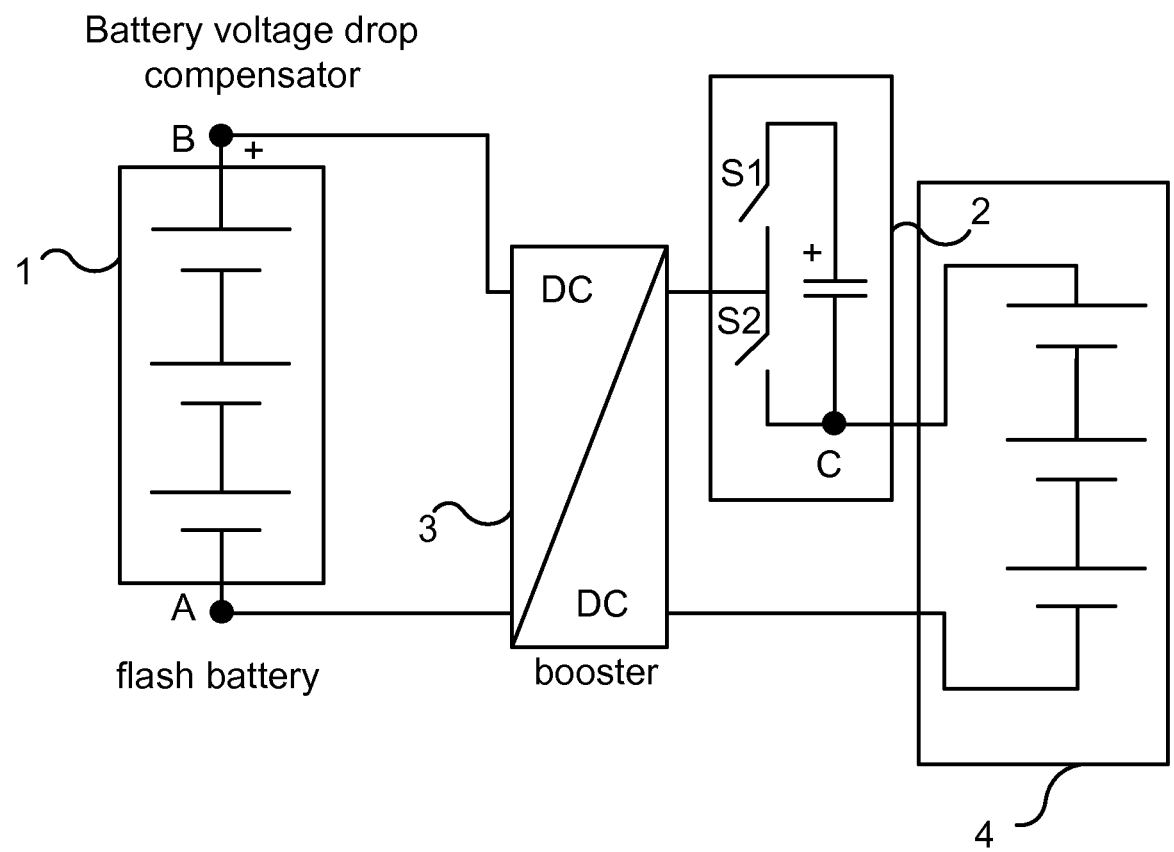
FIG. 5 is a schematic diagram illustrating an embodiment of a flash battery system and a load.

FIG. 5 illustrates a schematic drawing of a flash charging system according to an embodiment, wherein the half-bridge cell is arranged onboard a load device instead of in a wayside charging station as described with reference to FIG. 1. In this configuration the half-bridge cell is arranged in series with the onboard battery 4, between the DC-DC converter 3 and the onboard battery 4.

An exemplifying dimensioning for high power, flash charging of an onboard battery without a half-bridge cell according to the present invention.

DC-DC booster max voltage: $V_{max,dcdc} = 600$ V
DC-DC booster max amperage: $I_{max} = 1200$ A
Discharge power requirement: $P_{required} = 600$ kW $$V_{batt,min} = 600 \text{ kW}/1200 \text{ A} = 500 \text{ V}$$

Lithium Titanate (LTO) is a Li-ion battery chemistry suitable for the present application, due to the combination of high cycle count throughout the lifetime of the system and a very high specific power. In a high power, flash battery system, based on 220 20 Ah LTO cells connected in series, $R_{batt,series} = 0.76$ ohm at end of life. The voltage drop caused by polarization is small compared to this value for reasonable number of discharge times.

If 90% state-of-charge (SOC) is selected as the operation point for the wayside flash battery, the $V_{batt,OCV} = 2.55$ V/cell→600V/2.55=235 cells in series required. However, each battery module is based on a certain number of cells in series, and practically the maximum cells in series will be 220. That gives a $V_{batt,OCV}$ of 2.55*220=550 V. $V_{batt,min}$ is 500 V given by $I_{max,dcdc}$ and $P_{required}$. That leaves 55 V as an acceptable voltage drop. A maximum acceptable battery resistance of (550-500)/1200=0.046 ohm is then given. To achieve this low impedance, 0.76/0.046=17 battery strings in parallel are required. However, the true power capability of those 17 strings would be massively over-dimensioned, the only reason for adding all those batteries are to maintain the battery voltage above 500 V.

Now consider a high power, flash battery system based on the present invention. A half-bridge cell with a voltage rating of 80 V is used. The $V_{batt,OCV}$ is kept at 2.55 V/cell (90% SOC) but the number of cells are increased from 220 to 260 which provide a $V_{batt,OCV}$=663 V. By this modification, the battery string resistance increase to 260/220*0.76 ohm=0.90 ohm.

During no-load of the system the half-bridge cell is connected, such that the complete system voltage is 663−80=583 V (<$V_{max,dcdc}$). As soon as the discharge starts, the battery voltage $V_{batt}$ drops to $V_{batt,OCV}$−Ri*I=663[V]−(1/n)*0.9 [ohm]*1200[A], where n is the number of battery strings in parallel. With n=6, $V_{batt}$=511 V, hence satisfying the discharge power requirement at end of life.

The present invention reduces the required number of parallel battery strings from 17 to 6. Battery string voltage is increased by 18%. Hence, the total battery system size is reduced to (6/17)*1.18=42% of the size without the present invention. Such a size reduction entails a significant cost reduction with maintained capacity.

The voltage rating of the S1 and S2 devices would in this design example need to be 150-200 V. A suitable switching device may be a standard MOSFET device with low on-state resistance, such as the INFINEON IPP075N15N3 G MOSFET transistor, rated at 150 V and 100 A. The on-state resistance is 0.0062 ohm, and 12 devices are needed in parallel per position (i.e. 24 devices in total) to achieve the current capability, hence the added resistance from the half-bridge cell would be in the range of 0.0062/12=0.5 mOhm, which is negligible compared to the battery system resistance.

The time it takes for the load (DC-DC converter) to go from 0 A to 1200 A is about 1 ms. Drifting of the voltage of the half-bridge cell of 600−583=17 V during one transition is acceptable. That gives the required capacitance of the capacitor to C=1200/(17*103)=70 mF. Capacitors with a 100 V (DC) rating can thus be used.

A high power, flash battery system, according to an embodiment, is presented with reference to FIG. 1. The system comprises a wayside flash battery 1 and a half-bridge cell 2. The half-bridge cell has a voltage polarity opposite to that of the wayside flash battery, wherein the half-bridge cell is configured to be in a voltage compensation mode when the system is unloaded, and to be switched to a bypass mode when a voltage drop occurs due to the system being loaded.

The half-bridge cell may comprise two switches S1, S2 configured to work in complementary mode to provide the voltage compensation mode and the bypass mode, respectively. When the half-bridge cell is arranged onboard a device the voltage compensation mode will be a voltage increase mode, and when the half-bridge cell is arranged in a wayside station the voltage compensation mode will be a voltage decrease mode.

The half-bridge cell may comprise a capacitor connected in series between the wayside flash battery through a first switch St and an onboard battery. The half-bridge cell may comprise a low power discharge circuit configured to prevent capacitor voltage drift during repeated operation.

A high power, charging station, according to an embodiment is presented. The station comprises a wayside flash battery 1 and a half-bridge cell 2 connected in series with the wayside flash battery. The half-bridge cell has a voltage polarity opposite to that of the wayside flash battery, wherein the half-bridge cell is configured to be in a voltage decrease mode when the station is unloaded, and to be switched to a bypass mode when a voltage drop occurs due to the system being loaded.

An onboard battery operated device, according to an embodiment, is presented. The device comprises a battery 4 and a half-bridge cell 2 connected in series with the battery. The half-bridge cell has a voltage polarity equal to that of the battery, wherein the half-bridge cell is configured to be in a voltage increase mode when the device is not charged, and to be switched to a bypass mode when a voltage drop occurs due to the device being charged.

Figure 4:
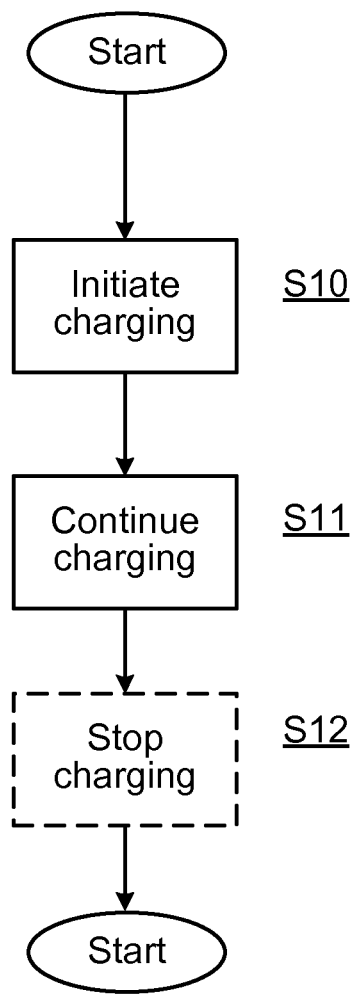
FIG. 4 is a flow chart illustrating a method according to an embodiment presented herein.

A method, according to an embodiment, for flash charging of an onboard battery 4 from a high power, wayside flash battery 1 is presented with reference to FIG. 4. The method comprises initiate charging S10 of the onboard battery through a half-bridge cell 2, which half-bridge cell has a voltage polarity opposite to that of the high power, wayside flash battery, and continue charging S11 of the onboard battery with the half-bridge cell bypassed.

The half-bridge cell may be bypassed when a voltage drop occurs after the initial charging.

The method may comprise stop charging S12 of the onboard battery when a charging voltage of the high power, wayside flash battery drops below a minimum voltage of DC-DC converter 3 connected between the half-bridge cell and the onboard battery 4.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A high power flash battery system for flash charging of an onboard battery, comprising:
   a wayside flash battery; and
   a half-bridge cell comprising:
      a first switch and a second switch configured to work in complementary mode to provide a voltage compensation mode and a bypass mode, respectively; and
      a capacitor, a supercapacitor, or a battery, connected in series between the wayside flash battery through the first switch and a load,
      wherein the half-bridge cell has a voltage polarity opposite to that of the wayside flash battery,
   wherein the half-bridge cell is configured to be in the voltage compensation mode when the system is unloaded, and to be switched to the bypass mode when a voltage drop occurs due to the system being loaded.

2. The system according to claim 1, wherein the half-bridge cell comprises a low power discharge circuit configured to prevent capacitor voltage drift during repeated operation.

3. The system according to claim 1, wherein the load is a DC-DC converter.

4. The system according to claim 1, wherein the load is a DC-AC converter.

5. A high power charging station for flash charging of an onboard battery, comprising:
   a wayside flash battery; and
   a half-bridge cell comprising:
      two switches a first switch and a second switch configured to work in complementary mode to provide a voltage compensation mode and a bypass mode, respectively; and
      a capacitor, a supercapacitor, or a battery, connected in series between the wayside flash battery through the first switch and a load,
      wherein the half-bridge cell is connected in series with the wayside flash battery, and has a voltage polarity opposite to that of the wayside flash battery,
   wherein the half-bridge cell is configured to be in a voltage decrease mode when the station is unloaded, and to be switched to the bypass mode when a voltage drop occurs due to the system being loaded.

6. The system according to claim 5, wherein the half-bridge cell comprises a low power discharge circuit configured to prevent capacitor voltage drift during repeated operation.

7. The system according to claim 5, wherein the load is a DC-DC converter.

8. The system according to claim 5, wherein the load is a DC-AC converter.

9. An onboard battery operated device for flash charging of an onboard battery, comprising:
   an onboard battery; and
   a half-bridge cell comprising:
      a first switch and a second switch configured to work in complementary mode to provide a voltage compensation mode and a bypass mode, respectively; and
      a capacitor, a supercapacitor, or a battery, connected in series between the wayside flash battery through the first switch and a load,
   wherein the half-bridge cell is connected in series with the onboard battery, and has a voltage polarity equal to that of the onboard battery,
   wherein the half-bridge cell is configured to be in an increase mode when the device is not charged, and to be switched to the bypass mode when a voltage drop occurs due to the device being charged.

10. The system according to claim 9, wherein the half-bridge cell comprises a low power discharge circuit configured to prevent capacitor voltage drift during repeated operation.

11. The system according to claim 9, wherein the load is a DC-DC converter.

12. The system according to claim 9, wherein the load is a DC-AC converter.

13. A method for flash charging of an onboard battery from a high power, wayside flash battery, comprising:
   initiate charging of the onboard battery through a half-bridge cell comprising:
      a first switch and a second switch configured to work in complementary mode to provide a voltage compensation mode and a bypass mode, respectively; and
      a capacitor, a supercapacitor, or a battery, connected in series between the wayside flash battery through the first switch and a load,
   wherein the half-bridge cell has a voltage polarity opposite of that of the high power, wayside flash battery; and
   continue charging of the onboard battery with the half-bridge cell bypassed, wherein the half-bridge cell is bypassed when a voltage drop occurs after the initial charging.

14. The method according to claim 13, comprising:
   stop charging of the onboard battery when a charging voltage of the high power, wayside flash battery drops below a minimum voltage of DC-DC converter connected between the half-bridge cell and the onboard battery.

15. The method according to claim 13, wherein the half-bridge cell comprises a low power discharge circuit configured to prevent capacitor voltage drift during repeated operation.

16. The method according to claim 13, wherein the load is a DC-DC converter.

17. The method according to claim 13, wherein the load is a DC-AC converter.

\* \* \* \* \*

UNITED STATES PATENT AND TRADEMARK OFFICE
CERTIFICATE OF CORRECTION

PATENT NO. : 10,840,731 B2
APPLICATION NO. : 16/469017
DATED : November 17, 2020
INVENTOR(S) : Tomas Tengner Page 1 of 1

It is certified that error appears in the above-identified patent and that said Letters Patent is hereby corrected as shown below:

In the Claims

In Column 6, Line 56, Claim 5, delete "two switches".

Signed and Sealed this
Second Day of February, 2021

Drew Hirshfeld
*Performing the Functions and Duties of the
Under Secretary of Commerce for Intellectual Property and
Director of the United States Patent and Trademark Office*